United States Patent [19]  [11] 4,175,537
Wiener  [45] Nov. 27, 1979

[54] DRESSING ARRANGEMENT FOR GRINDING WHEEL OF A GEAR FORM GRINDING MACHINE

[76] Inventor: Dieter Wiener, Tulpenstrasse 9, D-7501 Bruchhausen, Fed. Rep. of Germany

[21] Appl. No.: 851,428

[22] Filed: Nov. 14, 1977

Related U.S. Application Data

[63] Continuation of Ser. No. 501,663, Aug. 29, 1974, abandoned.

[30] Foreign Application Priority Data

Aug. 29, 1973 [DE] Fed. Rep. of Germany ....... 2343494

[51] Int. Cl.$^2$ .............................................. B24B 53/06
[52] U.S. Cl. .................................. 125/11 CD; 51/287
[58] Field of Search ................... 125/11 R, 11.2, 11 T; 51/206, 287

[56] References Cited

U.S. PATENT DOCUMENTS

| | | | |
|---|---|---|---|
| 1,440,338 | 12/1922 | Buswell | 125/11.2 |
| 1,759,333 | 5/1930 | Wildhaber | 51/52 HB |
| 2,048,520 | 7/1936 | Schurr | 51/206 P |
| 2,195,050 | 3/1940 | Wallace | 51/206 P |
| 2,351,842 | 6/1944 | Seibold | 51/206 P |
| 3,602,209 | 7/1968 | Bocker | 51/287 X |

Primary Examiner—Harold D. Whitehead
Attorney, Agent, or Firm—Craig and Antonelli

[57] ABSTRACT

A dressing arrangement for a gear grinding machine for form grinding helically geared wheels with a grinding wheel oriented with respect to the workpiece gear at an angle of inclination corresponding to the angle of inclination of the teeth of the workpiece gear. A dressing tool is provided with truing flanks in the form of a cut out of the workpiece gear and includes at least one tooth or tooth gap. The truing flanks are provided with diamond grains by coating the same or by applying a coated band on the flanks. The dressing tool may be mounted on its own axle to cooperate at any desired point with the form grinding wheel or the dressing tool and the gear workpiece may be disposed on the same axle. The dressing tool may also be disposed on a carrier having at least a single tooth mounted thereon with the coated band being disposed on the single tooth.

25 Claims, 8 Drawing Figures

DRESSING ARRANGEMENT FOR GRINDING WHEEL OF A GEAR FORM GRINDING MACHINE

This is a continuation, of application Ser. No. 501,663 filed Aug. 29, 1974, now abandoned.

The present invention relates to a dressing arrangement and, more particularly, to a dressing device on a gear grinding machine for the form grinding of internally or externally helically geared wheels with a grinding wheel oriented with respect to the workpiece gear in correspondence with the helix angle or angle of inclination of the teeth of the workpiece gear, wherein the contour corresponding to the contact line of the grinding wheel and workpiece gear is copied by a helically reciprocating dressing tool.

The present invention relates to a truing device such as disclosed, for example, in U.S. Pat. No. 2,897,634. This patent relates to the theoretical background in the manufacture of form grinding wheels. In column 5, lines 68–72, an experimental possibility is discussed, according to which the grinding disk is to rotate past a cutting and/or truing edge line in the given, helical tooth surface and being, in turn, reciprocated helically. By means of such a truing edge, the grinding wheel profile can be produced in a point-wise operation, for example, only by a rather expensive method.

The present invention has for its object the production of a contact line accurately in a continuous manner, rather than a point for point manner.

The aforementioned object is attained, in accordance with the present invention, by providing a known dressing tool with truing flanks in the form of a cut out of the workpiece gear wheel comprising at least one tooth or one tooth gap, and by studding the truing flanks with diamond grains or the like.

The invention utilizes the fact that, by a reversal of the manufacturing process to the dressing procedure, the grinding wheel can be dressed exactly and continuously, wherein, for the dressing step, merely the same control-technological and mechanical means are required as for the grinding process proper. Since, during the dressing step, the same contact conditions prevail as during grinding, the grinding wheel in each case receives the profile adapted to the respective grinding wheel diameter. Thus, a possibility has been discovered of manufacturing especially helical-tooth workpiece gear wheels with internal or external gearing with great accuracy and minor structural expenditure by means of form grinding.

Although the use of a dressing tool having the shape of a workpiece gear is essentially conventional in hobbing grinding processes for truing of the grinding worm, as for example, disclosed in East German Pat. No. 4,850 and West German Pat. No. 1,272,686, entirely different contact relationships are present during hobbing than during form grinding. The conventional processes do not have the problem of the three-dimensional line of contact between the workpiece gear wheel and the grinding wheel, the shape and position of which may vary in dependence upon the grinding wheel diameter, and the configuration of which must be taken into account during the dressing step. In contrast thereto, the tooth-like dressing tool of the present invention solves an additional problem, namely, the accurate production of the spatial line of contact in a continuous operation. As compared to the hobbing grinding method, this makes it possible to produce the profile of the grinding wheel also without superposition of a generating or rolling motion, solely by the radial orientation of the grinding wheel and/or the dressing tool, without a helical motion. Thus, a rolling motion or process is not absolutely necessary.

The prior art has heretofore followed different paths in the form grinding of helical-tooth gears, in that the three-dimensional contact curve between the grinding wheel and the workpiece gear wheel is produced in approximation by a mechanically controlled single diamond or by a numerically controlled cylindrical diamond holder as described, for example, in "Industrie-Anzeiger" (Industry Advertiser) No. 93, June 10, 1971, pages 1186–1189. It has furthermore been proposed in "VDJ-Zeitschrift" (Engineering Journal) 102, Feb. 21, 1960, to sectionally dress the grinding wheel by the enveloping method by means of a generating gear and a single diamond. These approximation and iteration methods are, in contrast to the present invention, very complicated in structure and expensive, and also in part inaccurate.

According to the present invention, the dressing tool and/or the truing flanks thereof can be coated directly with diamond grains by a known coating technique. However, it is also possible according to the present invention to strap a steel band onto the truing flanks which band is coated at least in the zone of the truing flanks.

The invention will be described below with reference to several embodiments, to wit:

Figure 1:
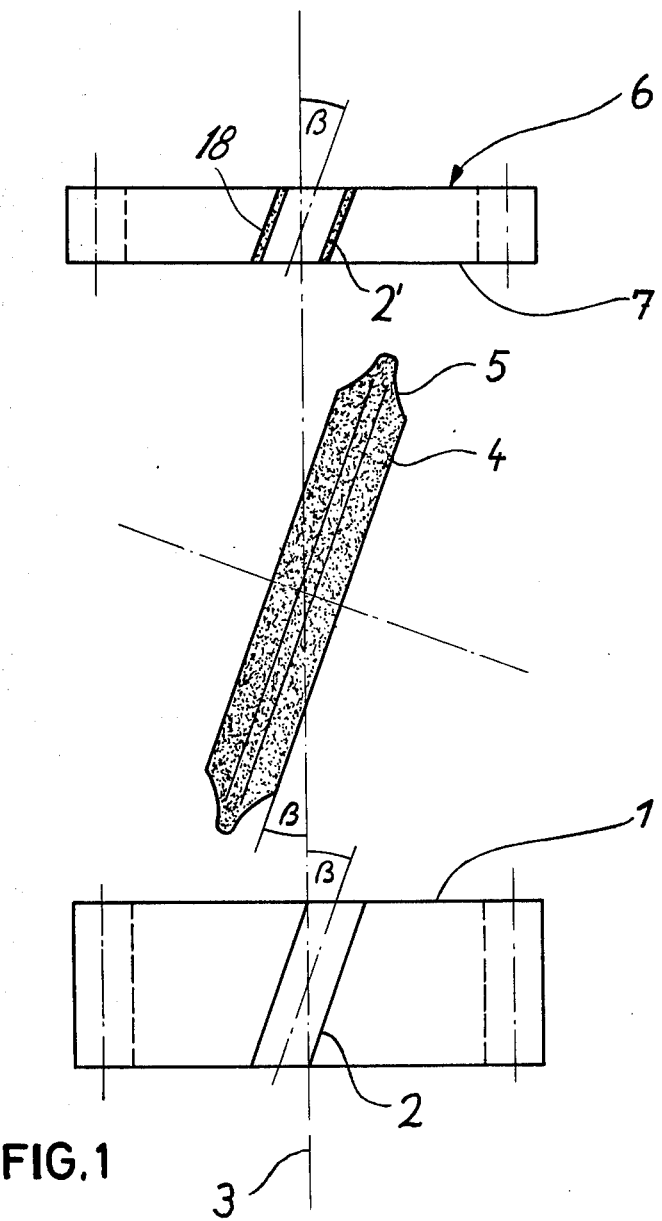
FIG. 1 is a schematic representation of the workpiece gear wheel, the grinding wheel, and dressing tool arrangement according to the present invention.

Referring now to the drawings wherein like reference numerals are used throughout the various views to designate like parts and more particularly to FIG. 1 which shows, in a front view, a workpiece gear wheel in the form of a spur gear 1 with an involute helical gearing 2; for reasons of simplifying the drawings, only one tooth gap is indicated. The spur gear 1 is seated on an axle 3 of a workpiece table not illustrated in detail. The grinding wheel 4 serves for the form grinding process and this wheel has, on the periphery thereof, a profile 5 corresponding to the profile tooth gap 2.

The grinding wheel 4 is oriented with respect to the axle 3 of the spur gear 1 in the helix angle $\beta$ of the gear teeth. The dressing tool 6 is seated on the axle 3 or may be disposed on another axle. The dressing tool of FIG. 1 is constructed as a truing wheel 7 and has teeth 2' corresponding to the teeth 2 of the spur gear 1.

Figure 4:
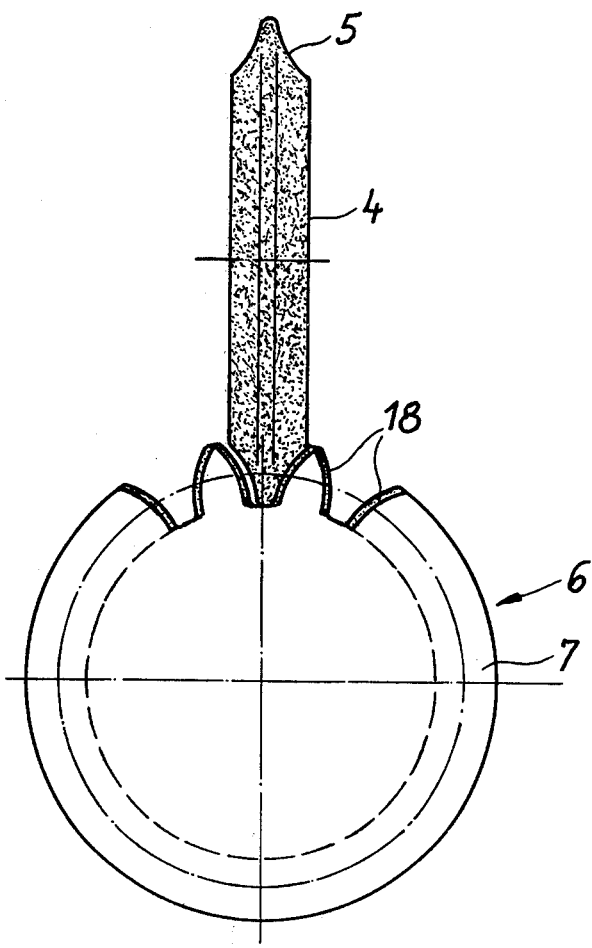
FIG. 4 is a top view of a dressing arrangement similar to FIG. 1, showing the coating thereof.

As indicated in FIG. 4, the tooth flanks of the dressing tool 6 are coated with diamond powder or the like by a layer 18 which is applied to each tooth flank and forms the dressing flank.

The grinding wheel 4 is either in constant engagement with the dressing wheel 6 or the latter is guided toward the grinding wheel 4 only sporadically, and only radial adjusting motion being sufficient if the axial spacing between the truing wheel 7 and the grinding wheel 4 is equal to the axial distance between the grinding wheel 4 and the workpiece gear wheel or spur gear 1.

Figure 2:
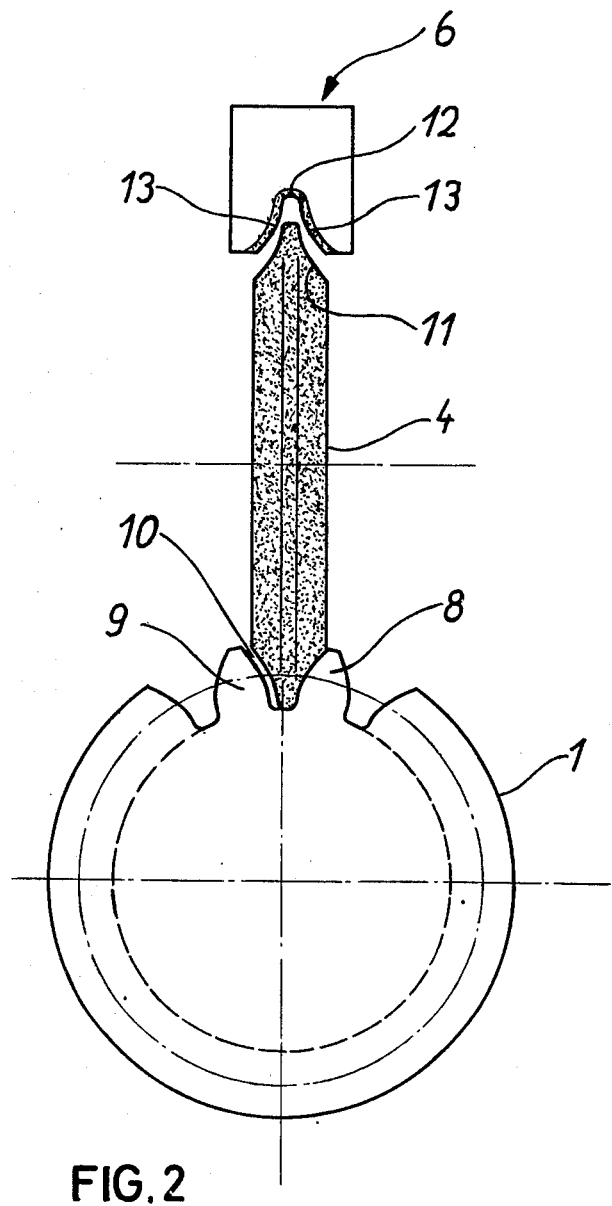
FIG. 2 is a top view of an involute workpiece gear wheel and a afurther embodiment of a dressing tool in accordance with the present invention.

FIG. 2 illustrates a helical-tooth spur gear 1 in a top view wherein two adjacent teeth 8,9 have been illustrated. The tooth gap disposed between the adjacent teeth is denoted by the reference numeral 10. The gearing, in turn, is produced by a form grinding wheel 4 which, in this case, is only indicated in projection. In this arrangement, the grinding wheel 4 has, as is conventional, a profile 11, the width of which is smaller than the width of the tooth gap 10. Accordingly, during grinding, first the left-hand flank of the tooth 8 is machined and, after turning the spur gear 1 by a minor angular amount, the right-hand flank of the tooth is then worked.

In FIG. 2, a dressing tool is illustrated with a single tooth gap 12 wherein the truing flanks 13 forming this gap 12 correspond to the flanks of teeth 8, 9. The tooth gap can either be as wide as the tooth gap at the spur gear 1 so that with rotation thereof from one tooth flank to the opposite tooth flank a corresponding motion of the dressing tool is likewise required. Alternatively, the tooth gap 12 can be adapted to the profile of the grinding wheel 4, which is of a smaller width, so that during the truing operation no additional adjusting motion is necessary.

Figure 3:
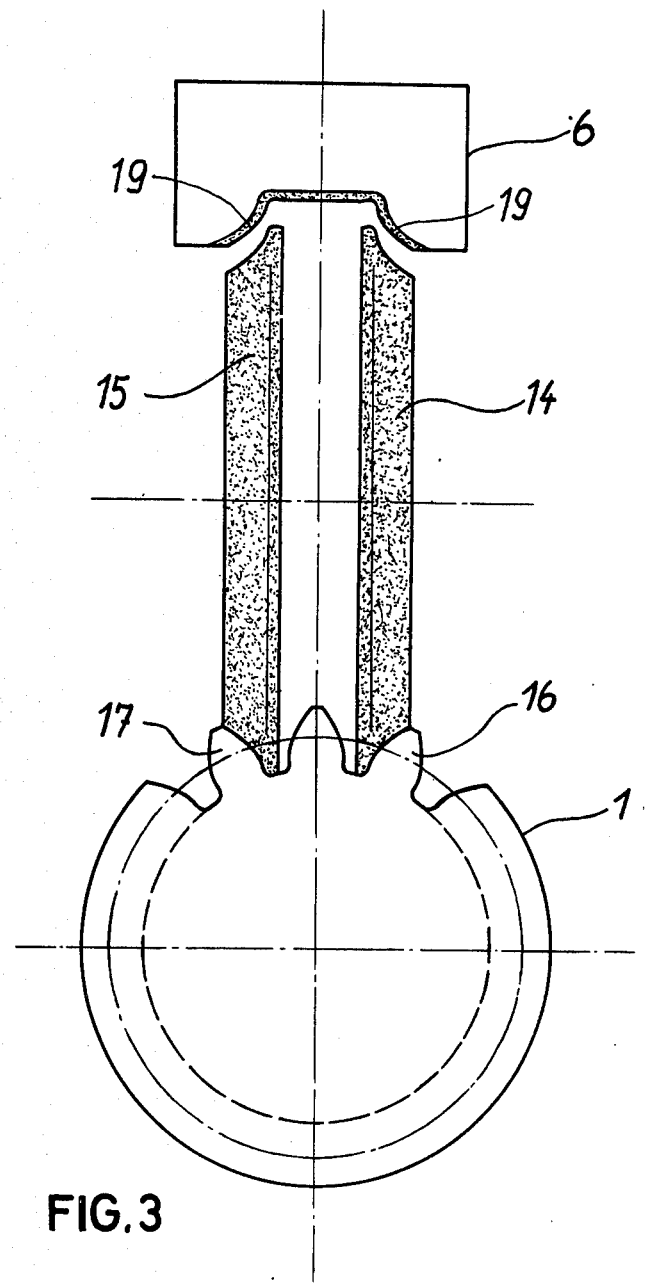
FIG. 3 is a top view of a further embodiment of a dressing tool arrangement in accordance with the present invention.

FIG. 3 shows a further embodiment of the present invention wherein the grinding wheel 4 as is likewise known, is divided approximately in the axis of the profile, so that two partial disks 14, 15 are provided. Two teeth 16, 17 can again be seen at the spur gear 1, wherein the partial grinding disk 14 machines the left-hand flank of tooth 16 and the partial grinding disk 15 works the right-hand flank of the tooth 17. The dressing tool 6 accordingly has two truing flanks 19 having the same spacing as the engaging flanks at the spur gear 1.

In all embodiments, a relative rotary motion and a relative longitudinal motion occur between the spur gear 1 and the grinding wheel 4 and/or the partial grinding disks 14, 15 during the grinding of either a tooth flank or both tooth flanks of a tooth of the spur gear 1. The rotary motion is generally executed by the spur gear 1 while the grinding wheel only performs the oscillating longitudinal motion and the cutting motion.

Figure 5:
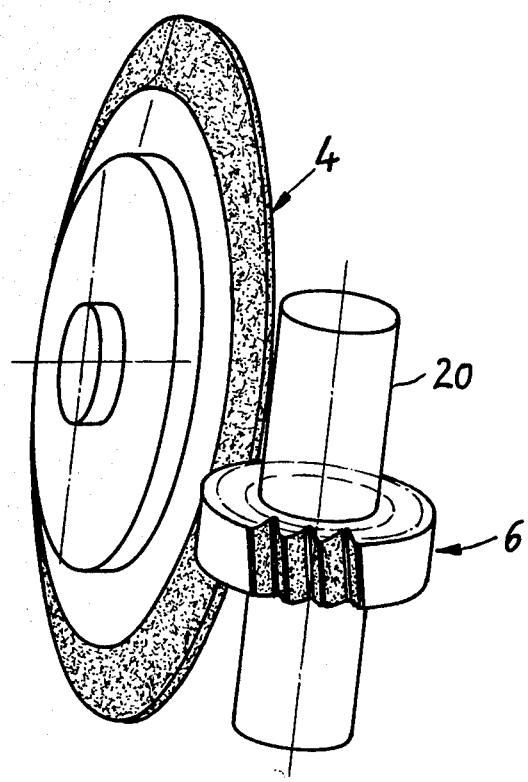
FIG. 5 is a perspective view of a dressing arrangement according to the present invention disposed separately from the gear wheel.
Figure 6:
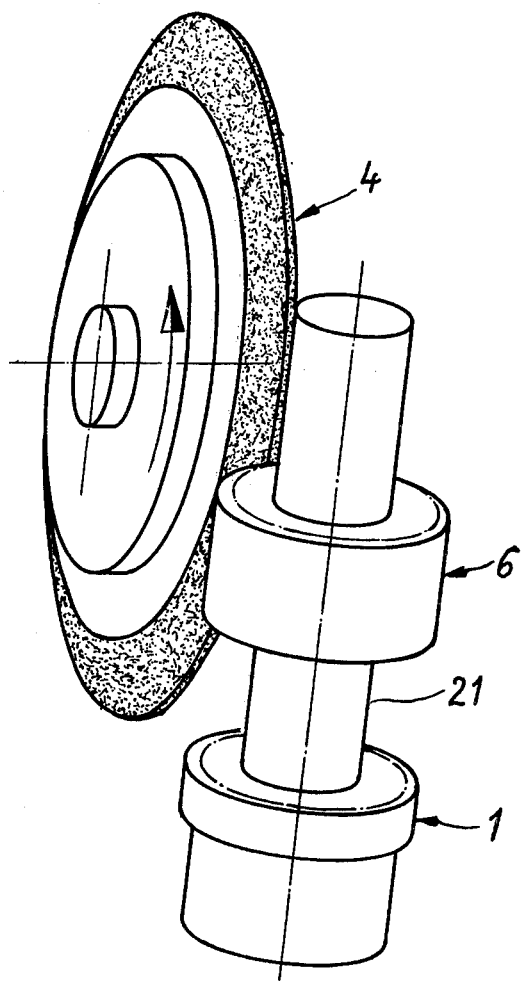
FIG. 6 is a perspective view of a further embodiment of the present invention similar to FIG. 5 wherein the dressing arrangement and the gear wheel are disposed on one axle.

FIG. 5 illustrates a further embodiment of the invention wherein the wheel-shaped dressing tool 6 cooperates at any desired point with the form grinding wheel 4 and, in particular, is mounted on its own axle 20. However, in the embodiment of FIG. 6, the dressing tool 6 and the gear wheel 1 are disposed on the same axle 21.

Figure 7:
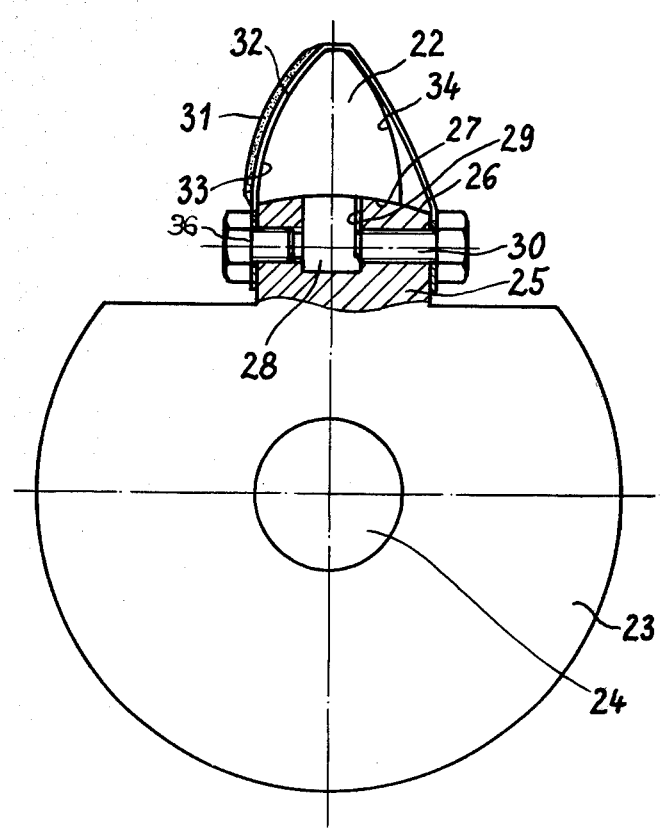
FIG. 7 is a partial sectional view of an individual dressing tooth in accordance with the present invention.

FIG. 7 provides an example of a further embodiment of the present invention wherein a single tooth 22 is mounted as the dressing tool on a carrier 23 which carrier, in turn, is seated on a driven axle 24. The tooth 22 is attached, in the close proximity of its root circle, to an extension 25 of the carrier 23. In the illustrated embodiment, the extension 25 is machined on its surface 26 to be spheroidal or partially cylindrical. A correspondingly spheroidal underside 27 is exhibited by the tooth 22 which has a pin 28 engaging in a hole 29 at the extension 25 and mounted by means of a screw 30 or the like.

In this embodiment, the diamond-grain coating 31 is applied to a steel band 32 clamped over the tooth 22 by means of a screw 36 and the aforementioned screw 30 so that the band 32 is in direct contact with one flank 33 of the tooth 22 while it is freely clamped in the zone of the other flank 34. By this free clamping feature, a flush contact of the coated section 31 with the tooth flank 33 is ensured at all times.

The construction of the coating arrangement described hereinabove has the advantage that the band 32 need merely be exchanged in case of wear. Also, the band can be readily kept in storage and can be used without any desired geometry of the dressing tooth 22. This possibility is furthermore enhanced by the illustrated construction in that the tooth 22, as described above, is detachably mounted to the carrier 23 so that the tooth can be exchanged without difficulties for a tooth of a different geometry.

Finally, the tooth 22 can be displaceable with respect to the carrier 23 in the direction of its axis (not shown). This latter arrangement is advantageous, for example, to make it possible to correct the base or root circle. If the tooth is simultaneously arranged to be tiltable, the angle of action can be corrected.

In FIG. 7 merely one truing flank 31, 32, 33 is shown; however, it is of course possible to arrange at least a further tooth of the same construction beside the first truing flank.

Figure 8:
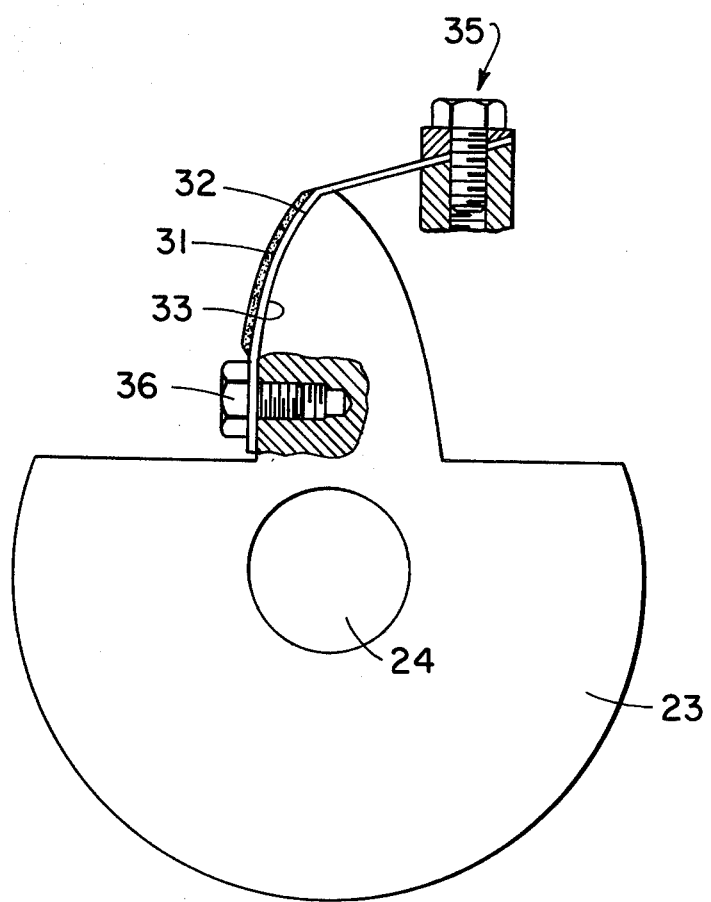
FIG. 8 is a partial sectional view of a further embodiment of an individual dressing tool in accordance with the present invention.

Instead of the clamping feature shown in FIG. 7, the coated band 32 can also be clamped in a manner illustrated in FIG. 8, in which case it can be pretensioned by pretensioning means generally designated by the reference numeral 35. The arrangement of FIG. 8 has the advantage that the band 32 need not be deflected or bent.

While I have shown and described several embodiments in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are encompassed by the scope of the appended claims.

I claim:

1. A dressing device for a grinding machine for form grinding of internally or externally helically geared wheels, the grinding machine including a grinding wheel inclined with respect to the workpiece in correspondence with the helix angle of the workpiece gear, and a movably mounted dressing tool, the dressing tool has a contour corresponding to a contact line of the grinding wheel and workpiece gear being copied by the movably mounted dressing tool, characterized in that the dressing tool is provided with truing flank means, said truing flank means is in the form of a section of the workpiece gear and is constituted by a tooth, said dressing tool includes a carrier means for carrying said tooth, means are provided for releasably securing said tooth to said carrier means, at least a portion of the truing flank means are provided with an abrasive material consisting of diamond grains, spaced axle means are provided for respectively mounting said dressing tool, the grinding wheel and the workpiece gear, the spacing between said dressing tool and the grinding wheel and between the grinding wheel and the workpiece gear are equal, and in that said dressing tool is movably mounted for radial adjustment only.

2. Device according to claim 1, characterized in that said tooth is at least one of displaceable with respect to said carrier means in the direction of a longitudinal axis thereof and tiltable about an axis spaced from the axis of said carrier means.

3. A dressing device for a gear grinding machine for form grinding of internally or externally helically geared wheels, the grinding machine including a grinding wheel inclined with respect to the workpiece gear in correspondence with the helix angle of the workpiece gear, and a movably mounted dressing tool, the contour corresponding to the contact line of the grinding wheel and workpiece gear being copied by the movably mounted dressing tool, characterized in that the dressing tool is provided with truing flank means, said truing flank means is in the form of a section of the workpiece gear and includes at least one of a tooth and at least a pair of spaced teeth defining a tooth gap, at least a portion of the truing flank means is provided with an abrasive material, spaced axle means are provided for respectively mounting said dressing tool, the grinding wheel and the workpiece gear, the spacing between said dressing tool and the grinding wheel and between the grinding wheel and workpiece are equal, said dressing tool being movably mounted for radial adjustment only, said truing flank means is constituted by a tooth, said dressing tool includes a carrier means for carrying said tooth, means are provided for releasably securing said tooth to said carrier means, and in that said tooth is both displaceable with respect to said carrier means in the direction of a longitudinal axis thereof and is tiltable about an axis spaced from the axis of said carrier means.

4. Device according to claim 3, characterized in that said truing flank means are directly coated with said abrasive material.

5. Device according to claim 3, characterized in that a band means is provided, clamping means are provided for clamping said band means over said truing flank means, said band means being coated with said abrasive material.

6. Device according to claim 5, characterized in that said band means is coated only in an area thereof resting on said truing flank means.

7. Device according to claim 6, characterized in that said band means includes two end portions, said clamping means includes means for attaching one of said end portions at a base of said truing flank means with the coated zone extending thereover, said clamping means further including means for pretensioning the other of said end portions of said band means.

8. Device according to claim 7, characterized in that said band means is a steel band.

9. A dressing device for a gear grinding machine for form grinding of internally or externally helically geared wheels, the grinding machine including a grinding wheel inclined with respect to the workpiece gear in correspondence with the helix angle of the workpiece gear, and a movably mounted dressing tool, the dressing tool has a contour corresponding to a contact line of the grinding wheel and workpiece gear being copied by the movably mounted dressing tool, characterized in that the dressing tool is provided with truing flank means, said truing flank means is in the form of a section of the workpiece gear and is constituted by at least one pair of spaced teeth defining a tooth gap, said dressing tool includes a carrier means for carrying said spaced teeth, means are provided for releasably securing said spaced teeth to said carrier means, at least a portion of the truing flank means is provided with an abrasive material consisting of diamond grains, spaced axle means are provided for respectively mounting said dressing tool, the grinding wheel and the workpiece gear, the spacing between said dressing tool and the grinding wheel and between the grinding wheel and the workpiece gear are equal, and in that said dressing tool is movably mounted for radial adjustment only.

10. Device according to claim 9, characterized in that said spaced teeth are at least one of displaceable with respect to said carrier means in the direction of a longitudinal axis thereof and tiltable about an axis spaced from the axis of said carrier means.

11. Device according to claim 9, characterized in that said spaced teeth are both displaceable with respect to said carrier means in the direction of a longitudinal axis thereof and are tiltable about an axis spaced from the axis of said carrier means.

12. Device according to claim 11, characterized in that said truing flank means are directly coated with said abrasive material.

13. Device according to claim 11, characterized in that a band means is provided, clamping means are provided for clamping said band means over said truing flank means, and in that said band means is coated with said abrasive material.

14. Device according to claim 13, characterized in that said band means is coated only in an area thereof resting on said truing flank means.

15. Device according to claim 14, characterized in that said band means includes a pair of end portions, said clamping means includes means for attaching one of said end portions at a base of said truing flank means with the coated zone thereof extending thereover, and in that said clamping means further includes means for pretensioning the other of said end portions of said band means.

16. Device according to claim 15, characterized in that said band means is a steel band.

17. A dressing device for a gear grinding machine for form grinding of internally or externally helically geared wheels, the grinding machine including a grinding wheel inclined with respect to a workpiece gear in correspondence with a helix angle of the workpiece gear, and a movably mounted dressing tool, the dressing tool has a contour corresponding to a contact line of the grinding wheel and workpiece gear being copied by the movably mounted dressing tool, characterized in that said dressing tool is mounted for helical movement and is provided with truing flank means, said truing flank means are in the form of a section of the workpiece gear and include at least one of a tooth or at least a pair of spaced teeth defining a tooth gap, at least a portion of the truing flank means is provided with an abrasive material consisting of diamond grains, spaced axle means are provided for respectively mounting said dressing tool, the grinding wheel and the workpiece gear, and in that the spacing between said dressing tool and the grinding wheel and between the grinding wheel and the workpiece gear are equal.

18. Device according to claim 17, characterized in that said dressing tool is movably mounted for radial adjustment only.

19. Device according to claim 18, characterized in that said dressing tool has a three-dimensional configuration corresponding to the configuration of the workpiece gear.

20. Device according to claim 17, characterized in that said dressing tool has a three-dimensional configuration corresponding to the configuration of the workpiece gear.

21. Device according to claim 17, characterized in that said truing flank means are directly coated with said abrasive material.

22. Device according to claim 17, characterized in that a band means is provided, clamping means are provided for clamping said band means over said truing flank means, and said band means is coated with said abrasive material.

23. Device according to claim 22, characterized in that said band means is coated only in an area thereof resting on said truing flank means.

24. A dressing device for a gear grinding machine for form grinding of internally or externally helically geared wheels, the grinding machine including a grinding wheel inclined with respect to the workpiece gear in correspondence with the helix angle of the workpiece gear, and a movably mounted dressing tool, the contour corresponding to the contact line of the grinding wheel and workpiece gear being copied by the movably mounted dressing tool, characterized in that the dressing tool is provided with truing flank means, said truing flank means is in the form of a section of the workpiece gear and includes at least one of a tooth and at least a pair of spaced teeth defining a tooth gap, at least a portion of the truing flank means is provided with an abrasive material, in that a band means is provided, clamping means are provided for clamping said band means over said truing flank means, said band means is coated with an abrasive material only in an area thereof resting on said truing flank means, and in that the band means includes a pair of end portions, said clamping means includes means for attaching one of said end portions at a base of said truing flank means with the coated area thereof extending over said truing flank means, and in that said clamping means further includes means for pretensioning the other end of said end portions of said band means.

25. Device according to claim 24, characterized in that said band means is a steel band.

* * * * *